(12) United States Patent
Kimura et al.

(10) Patent No.: US 9,024,500 B2
(45) Date of Patent: May 5, 2015

(54) INSULATOR, AND STATOR AND MOTOR PROVIDED WITH SAME

(75) Inventors: Takaaki Kimura, Hiratsuka (JP); Yukihiko Sugimoto, Kamakura (JP); Ryou Kawai, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 160 days.

(21) Appl. No.: 13/808,891

(22) PCT Filed: Mar. 26, 2012

(86) PCT No.: PCT/JP2012/057745
§ 371 (c)(1),
(2), (4) Date: Jan. 7, 2013

(87) PCT Pub. No.: WO2012/133302
PCT Pub. Date: Oct. 4, 2012

(65) Prior Publication Data
US 2013/0115064 A1 May 9, 2013

(30) Foreign Application Priority Data
Mar. 31, 2011 (JP) ................................. 2011-077597

(51) Int. Cl.
| H02K 3/18 | (2006.01) |
| H02K 15/10 | (2006.01) |
| F01D 25/08 | (2006.01) |
| H02K 3/52 | (2006.01) |
| H02K 9/00 | (2006.01) |
| H02K 9/19 | (2006.01) |
| H02K 3/32 | (2006.01) |

(52) U.S. Cl.
CPC ................ *F01D 25/08* (2013.01); *H02K 3/522* (2013.01); *H02K 9/005* (2013.01); *H02K 9/19* (2013.01); *H02K 3/325* (2013.01)

(58) Field of Classification Search
USPC .................................. 310/214, 215, 260, 194
See application file for complete search history.

(56) References Cited

U.S. PATENT DOCUMENTS

| 2004/0263015 | A1 | 12/2004 | Okada et al. | |
| 2006/0033395 | A1* | 2/2006 | Izumi et al. | ................... 310/208 |
| 2006/0119207 | A1 | 6/2006 | Okada et al. | |
| 2007/0278869 | A1 | 12/2007 | Taketsuna | |
| 2009/0102312 | A1 | 4/2009 | Tsukashima | |
| 2009/0184591 | A1* | 7/2009 | Hoshino et al. | ................. 310/54 |
| 2010/0218918 | A1 | 9/2010 | Sonohara | |

(Continued)

FOREIGN PATENT DOCUMENTS

| CN | 1901328 A | 1/2007 |
| JP | 2002-281708 A | 9/2002 |

(Continued)

OTHER PUBLICATIONS

The Chinese Office Action for the corresponding Chinese application No. 201280001950.5, issued on Aug. 6, 2014.

*Primary Examiner* — Dang Le
(74) *Attorney, Agent, or Firm* — Global IP Counselors, LLP

(57) ABSTRACT

An insulator includes a main body, a latching portion, and a slot. The main body covers a portion of a stator core around which a coil is wound to insulate the stator core from the coil. The latching portion is disposed at an end of a portion of the main body around which the coil is wound to latch the coil onto the main body. The slot is formed so as to expose the coil at a portion of the latching portion on a side where cooling oil for cooling the coil is supplied to the coil.

11 Claims, 10 Drawing Sheets

(56) References Cited

U.S. PATENT DOCUMENTS

2011/0001400 A1    1/2011  Chiba et al.
2011/0115317 A1*  5/2011  Stark et al. ...................... 310/71

FOREIGN PATENT DOCUMENTS

| | | |
|---|---|---|
| JP | 2006-197772 A | 7/2006 |
| JP | 2006-197774 A | 7/2006 |
| JP | 2007-312560 A | 11/2007 |
| JP | 2008-301582 A | 12/2008 |
| JP | 2008-312276 A | 12/2008 |
| JP | 2009-71905 A | 4/2009 |
| JP | 2010-124657 A | 6/2010 |
| JP | 2010-239776 A | 10/2010 |
| WO | WO 2008/156127 A1 | 12/2008 |

* cited by examiner

INSULATOR, AND STATOR AND MOTOR PROVIDED WITH SAME

CROSS-REFERENCE TO RELATED APPLICATIONS

This application claims priority to Japanese Patent Application No. 2011-077597 filed on Mar. 31, 2011, the disclosure of which is hereby incorporated herein by reference in its entirety.

BACKGROUND OF THE INVENTION

1. Field of the Invention

The present invention relates to an insulator that is provided between a stator core and a coil, and to a stator and a motor in which this insulator is used.

2. Description of the Related Art

Insulators provided between a stator core and a coil have been used in the past in generators and other such motors to electrically insulate the stator core from the coil.

For example, Japanese Laid-Open Patent Application 2009-71905 discloses a configuration of a generator motor that has a stator in which a coil is wounded around a stator core, and in which adequate lubricating oil is supplied to two spline junctions at both ends of a linking shaft that spline-joins the output shaft of a hybrid engine and the input shaft of a hydraulic pump.

Japanese Laid-Open Patent Application 2007-312560 discloses an insulator that can be mounted to stator teeth after being wound with a coil, and with which the coil can be wound at a high tension.

SUMMARY

However, the following problems were encountered with the above-mentioned prior art.

With the generator motor disclosed in the above-mentioned Japanese Laid-Open Patent Application 2009-71905, cooling oil is supplied to the stator core and the coil by scooping up oil that has pooled in a sump inside a housing, by the rotation of an impeller provided on the rotor side, in order to cool the coil wound around the stator core.

Here, as shown in FIG. 7 of Japanese Laid-Open Patent Application 2007-312560, part of the insulator provided between the stator core and the coil must he provided at a position that is higher than the winding height of the coil, as a latching portion for latching the coil, in order to keep the coil wound around the stator core of Japanese Laid-Open Patent Application 2009-71905 from falling off.

In this case, when cooling oil is supplied to the coil by rotation on the rotor side, as in Japanese Laid-Open Patent Application 2009-71905, the latching portion provided on the inner radial side of the stator core becomes a. barrier between the coil and the cooling oil supply side, and the efficiency at which the coil is cooled by the cooling oil ends up decreasing.

It is an object of the present invention to provide an insulator with which the cooling efficiency of cooling oil supplied to a coil wound around a stator core can be increased, and a stator and a motor equipped with this insulator.

The insulator pertaining to the first aspect is an insulator that, is disposed between a stator core and a coil installed in a generator motor to which is supplied cooling oil for cooling the coil, and that electrically insulates the coil from the stator core, the insulator comprising a main body, a latching portion, and a slot. The main body covers the portion of the stator core around which the coil is wound, and insulates the stator core and the coil. The latching portion is provided to the end of the portion of the main body around which the coil is wound, and latches the coil onto the main body. The slot is formed so as to expose the coil at a portion of the latching portion on the side where the cooling oil for cooling the coil is supplied to the coil.

A slot that exposes the coil on the side where the cooling oil is supplied is provided to the latching portion used to latch the coil onto the stator core, as an insulator that insulates the coil and the stator core provided inside the generator motor.

The slot here is formed on the face of the latching portion where the cooling oil is supplied, so that the cooling oil can be easily supplied directly to the coil. For example, if the cooling oil is supplied from the inner radial side of the generator motor, the slot is provided on the inner radial side, and if the cooling oil is supplied from the outer radial side of the generator motor, the slot is formed on the outer radial side.

Usually, the latching portion is formed as a flat surface at the end of the main body in the axial direction, so that the coil wound around the main body of the insulator will not fall off. In this case, however, since the fiat latching portion ends up being provided on the side where the cooling oil is supplied, the latching portion becomes a barrier when the cooling oil is supplied directly to the coil.

In view of this, with the insulator of this aspect, the slot that exposes the coil is provided on the side of the latching portion where the cooling oil is supplied, so that the cooling oil will be supplied directly to the coil.

Consequently, the latching portion of the insulator does not become a barrier to the coil wound around the stator core, and the cooling oil is supplied directly to the coil, so the coil is cooled more efficiently by the cooling oil.

The insulator pertaining to the second aspect is the insulator pertaining to the first aspect, wherein the slot is formed in the latching portion disposed on the inner peripheral side of the stator.

Here, the slot that exposes the coil on the side where the cooling oil is supplied is provided to the latching portion disposed on the inner peripheral side of the stator.

Consequently, an insulator with high cooling efficiency can be applied to a generator motor in which cooling oil is supplied from the inner peripheral side of the stator by rotation on the rotor side, for example.

The insulator pertaining to the third aspect is the insulator pertaining to the first or second aspect, wherein the latching portion is substantially U-shaped.

Here, the latching member that is provided to prevent the coil wound around the stator core via the insulator from falling off is substantially U-shaped.

Consequently, a cut-out is formed in the center portion of the latching member, and this cut-out portion can be utilized as a slot.

The insulator pertaining to the fourth aspect is the insulator pertaining to any of the first to third aspects, wherein the latching portion is formed at, a position that is slightly higher than the winding height of the coil.

Here, the latching portion is provided up to a position that is slightly higher than the winding height of the coil.

Consequently cooling oil can be supplied directly to the coil by the latching portion where the slot is provided, which improves cooling efficiency and also prevents the coil wound around the stator core from falling off.

The insulator pertaining to the fifth aspect is the insulator pertaining to any of the first to fourth aspects, constituted by first and second members that are divided into upper and lower in the axial direction of the substantially annular stator core.

Here, the insulator has a structure that is divided into upper and lower parts (first member and second member) in the axial direction of the substantially annular stator core.

Consequently, the insulator can be attached more easily, being sandwiched between the upper and lower parts in the axial direction with respect to the stator core.

The insulator pertaining to the sixth aspect is the insulator pertaining to the fifth aspect, wherein the first and second members each have a support portion that supports a plurality of the main bodies on the inner radial side along the peripheral direction.

Here, the plurality of main bodies are integrated in the peripheral direction via the support portion so that a single insulator can be used to cover a plurality of stator teeth.

Consequently, a plurality of (such as three) stator teeth protruding inward in the radial direction of the stator core can be covered at the same time. Thus, assembly is much easier than when the insulators are attached one at a time to a single stator tooth.

The insulator pertaining to the seventh aspect is the insulator pertaining to the fifth or sixth aspect, wherein a stepped portion is provided at the junction where the first member and the second member are joined together.

Here, a stepped portion is formed at the portion where the first and second members divided into upper and lower in the axial direction are joined.

Consequently, even when high voltage is applied to the stator core, the stepped portion extends the path over which current flows, and prevents a large amount of current from flowing suddenly over the surface of the insulator.

The insulator pertaining to the eighth aspect is the insulator pertaining to any of the first to seventh aspects, further comprising a wiring guide that is provided on the outer radial side of the main body and guides the wiring of the coil in the prescribed direction.

Here, the coil wiring wound around the stator core via the insulator is guided in the desired direction by the wiring guide provided on the outer radial side of the main body.

Consequently, since the wiring guide is provided to part of the insulator, the coil wiring can be collectively guided to an electrical box.

The insulator pertaining to the ninth aspect is the insulator pertaining to any of the first to eighth aspects, further comprising a support portion that supports a plurality of the main bodies on the inner radial side along the peripheral direction, and grooves that are formed in the face of the support portion on the inner radial side and the side face of the latching portion, and into which are inserted insulation material for insulating adjacent coils.

Here, in a configuration in which a plurality of main bodies are supported on the inner radial side of a support portion disposed along the peripheral direction, grooves into which are inserted a substantially T-shaped insulation material (as seen from the axial direction) are provided to the face on the inner radial side of the main bodies and the side face of the latching portion.

Consequently, insulation can be ensured between a plurality of adjacent coils by inserting the insulation material into specific grooves.

The insulator pertaining to the tenth aspect is the insulator pertaining to any of the first to ninth aspects, further comprising a support portion that supports a plurality of the main bodies on the inner radial side along the peripheral direction, and ribs that are formed on the face of the support portion on the outer radial side and that run along the radial direction.

Here, in a configuration in which a plurality of main bodies are supported on the inner radial side of a support portion disposed along the peripheral direction, reinforcing ribs that run along the radial direction are provided to the face of the support portion on the outer radial side.

Consequently, even with a configuration in which a plurality of main bodies are integrated via a support portion, providing reinforcing ribs ensures adequate strength of the insulator.

The stator pertaining to the eleventh aspect comprises the insulator pertaining to any of the first to tenth aspects, the stator core to which insulator is mounted, and the coil that is wound around the stator core via the insulator.

The motor pertaining to the twelfth aspect comprises the stator pertaining to the eleventh aspect, a rotor that rotates with respect to the stator, and a rotational shaft that serves as the rotational center of the rotor.

DESCRIPTION OF THE INVENTION

Figure 1:
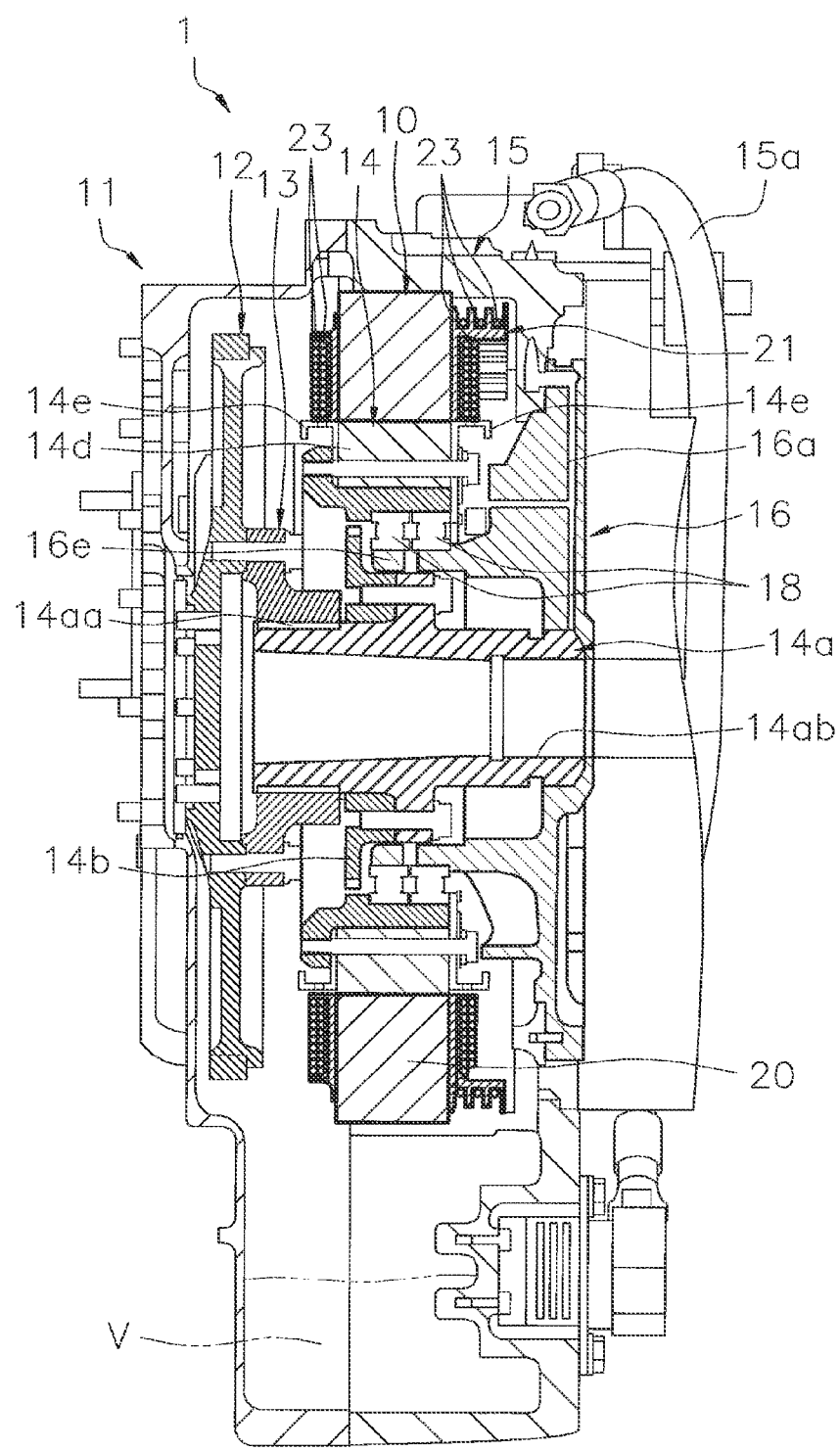
FIG. 1 is a cross section of the configuration of a generator motor equipped with a stator that includes the insulator pertaining to an embodiment of the present invention.

The insulator 21 pertaining to an embodiment of the present invention, as well as a stator 10 and generator motor (motor) 1 equipped with this insulator, will now be described through reference to FIGS. 1 to 10.

In the following description, "axial direction," "radial direction," and "peripheral direction" refer to their respective directions in a state of being installed in the generator motor 1. More specifically, "axial direction" means the axial direction of a rotational shaft 14a of a rotor 14 of the generator motor 5 (the left and right direction in FIG. 1). "Radial direction" means the radial direction of a circle whose center is the rotational shaft 14a. And "peripheral direction" means the peripheral direction of a circle whose center is the rotational shaft 14a.

Also, in the following description, an example is given in which the insulator 21 has a configuration encompassing the entire 360-degree periphery covering all of the protrusions 20a include in a stator core 20, but the smallest unit of the insulator of the present invention may be the first and second members 31 and 32 alone (discussed below).

Configuration of Generator Motor 1

The generator motor 1 pertaining to this embodiment is installed in a hybrid construction machine (such as a hydraulic excavator), and is disposed so that it is sandwiched between a hydraulic pump and an engine (not shown).

A hybrid hydraulic excavator comprises a traveling unit and a revolving unit provided revolvably to the traveling unit. The revolving unit comprises a work implement, a cap, a counterweight, and an engine compartment. The revolving unit is driven by a rotary electric motor operated by electrical energy from a capacitor or a generator motor. The rotary electric motor generates power by regeneration during deceleration of the revolving unit, and the electrical energy obtained by this power generation is stored in a capacitor.

The rotational shaft 14a (see FIG. 2) of the generator motor 1 is directly or indirectly connected to the input shaft of a hydraulic pump and the output shaft of the engine, and power is generated by the rotary drive force of the output shaft of the engine. The generator motor 1 is connected via an inductor to the capacitor. When the engine speed is rising (when the hydraulic excavator is accelerating), for example, the generator motor 1 is used as needed as an electric motor by means of the electrical energy stored in the capacitor, and assists the rotation of the engine. When the engine is idling, the generator motor 1 receives the rotary drive force of the engine and generates power, and the electrical energy thus generated is stored in the capacitor.

Figure 2:
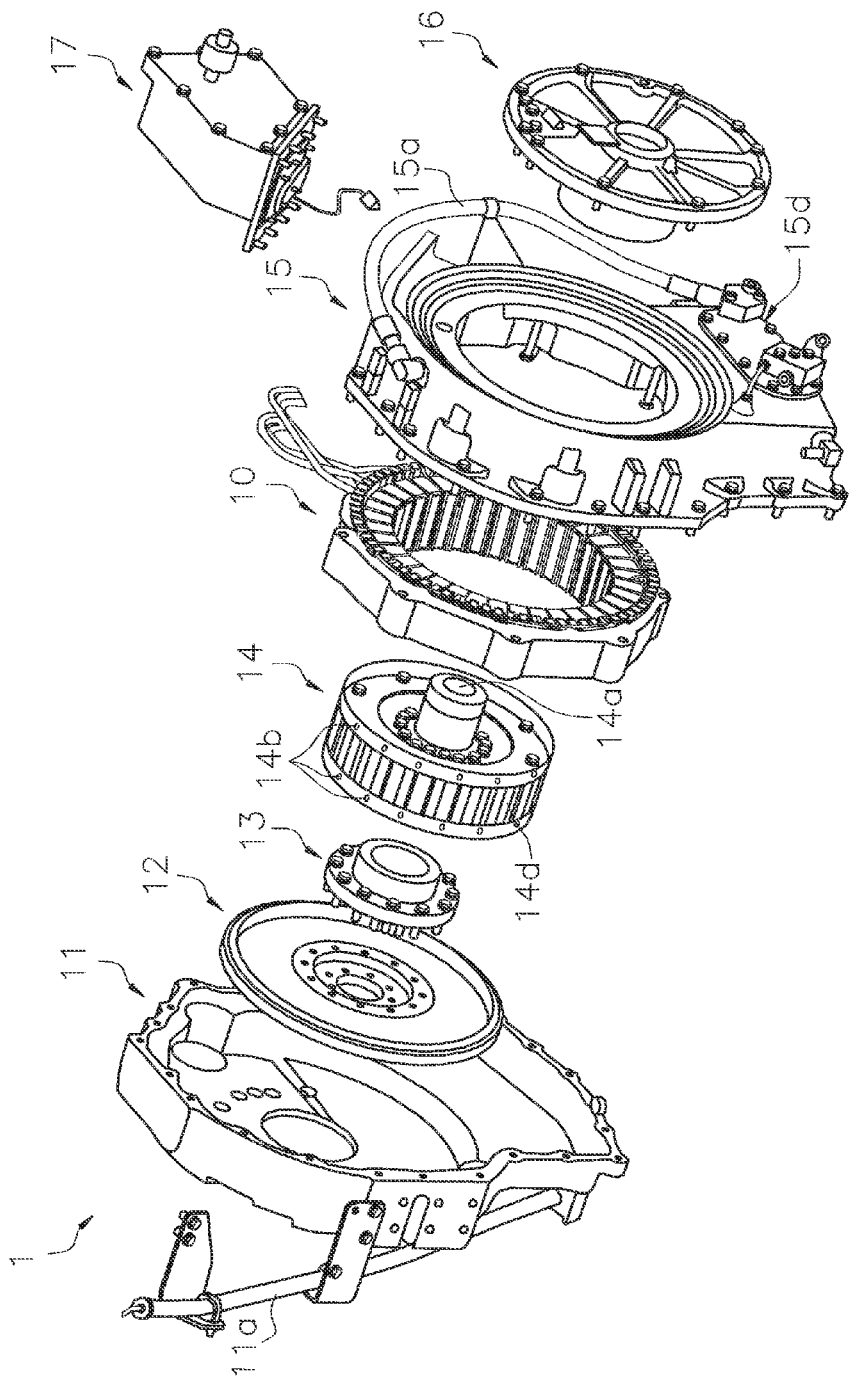
FIG. 2 is an exploded view of the generator motor in FIG. 1.

The generator motor 1 is a three-phase, 12-pole SR (switched reluctance) motor, and as shown in FIGS. 1 and 2, comprises the stator 10, a first housing 11, a flywheel 12, a coupling 13, the rotor 14, a second housing 15, and a flange 16.

Figure 3:
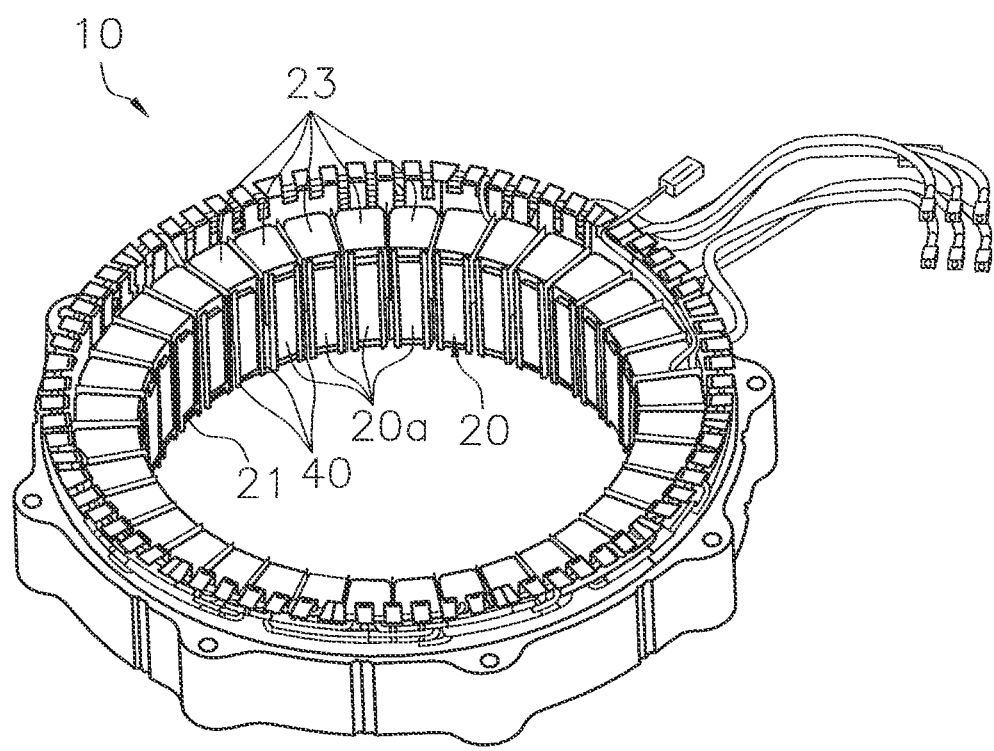
FIG. 3 is an oblique view of the configuration of the stator included in the generator motor in FIG. 1.

As shown in FIG. 2, the stator 10 is provided inside a space formed within the first and second housings 11 and 15, which make up the outer profile of the generator motor 1. As shown in FIG. 3, the stator 10 is made up of a circular stator core 20, and an insulator 21, coils 23, and so forth (discussed below).

The stator core 20 is produced by stacking a plurality of steel plates that include a circular yoke portion and stator teeth portions that are disposed along the peripheral direction and protrude at an equal angular spacing inward in the radial direction from, the yoke part. The stator core 20 is configured to include a plurality of protrusions (stator teeth) 20a that protrude inward in the radial direction. In this embodiment, a stator core 20 that includes a total of 36 protrusions 20a is used to configure a 12-pole SR motor.

An insulator 21 is mounted on each of the protrusions 20a, after which these are wound with the coils 23. The configuration of the insulator 21 mounted on the protrusions 20a of the stator core 20 will be discussed in detail at a later point.

The first housing 11 is made of cast iron, and is joined with the second housing 15 to form a space that holds the stator 10, the rotor 14, and so on. A sump V that holds cooling oil for cooling the heat generating parts of the stator 10 (such as the coils 23) and for lubricating the rotational shaft 14a and a bearing 18 is formed in the lower part of this space. Also, as shown in FIG. 2, an oil level detection pipe 11a (also serves as an oil feed pipe) that communicates with the sump V shown in FIG. 1 is connected to the lower end of the first housing 11.

The cooling oil held in the sump V inside the first and second housings 11 and 15 is circulated by a circulation pump (not shown), is cooled by going through a cooling device (such as an oil cooler 15d (see FIG. 2)) provided to the lower part of the second housing 15, and then goes back into the space inside the first and second housings 11 and 15.

The flywheel 12 is provided on the engine output shaft side within the first and second housings 11 and 15, is connected via the coupling 13 to the rotor 14, and rotates inside the first and second housings 11 and 15.

As shown in FIG. 2, the coupling 13 is a substantially circular member, and is bolted to the flywheel 12. The coupling 13 is such that splines formed on the inner radial side mesh with external splines 14aa formed on the outer radial side of the rotational shaft 14a. Consequently, the flywheel 12 and the coupling 13 rotate along with the rotor 14 around the rotational shaft 14a.

Figure 4:
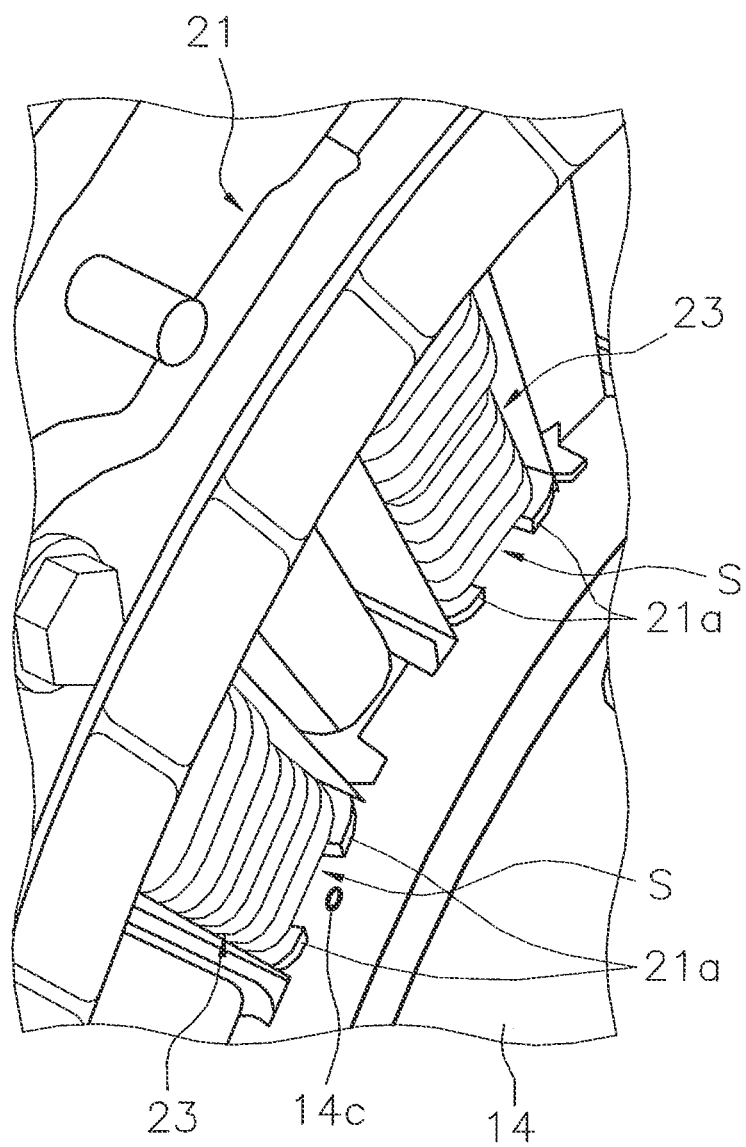
FIG. 4 is an oblique view of the positional relation between a cooling oil injection port and the coils of the stator in FIG. 3.

The rotor 14 is a member on the rotating side, which rotates around the rotational shaft 14a, and is disposed in a space on the inner peripheral side of the circular stator 10 in the holding space inside the first and second housings 11 and 15. The rotor 14 has a holder 14b to which a rotor yoke 14d is attached on the outer peripheral side. As shown in FIG. 4, a plurality of cooling oil injection ports 14c for supplying cooling oil to the coils 23 wound around the insulator 21 on the stator 10 side, which is opposite the face on the outer radial side, are provided to the outer peripheral face of the rotor 14.

The rotational shaft 14a is a cylindrical member that is the rotational center of the rotor 14, has a through-hole that goes from one end to the other end in the axial direction, on the engine-side (the left side in FIG. 1) end are formed external splines 14aa that mate with the inside teeth of the coupling 13, and on the hydraulic pump-side (the right side in FIG. 1) end are formed internal splines 14ab that mate with the input shaft on the hydraulic pump side. The rotational shaft 14a is fixed in a state in which the half on the hydraulic pump side in the axial direction is inserted on the inner peripheral face side of the cylindrical part, on the inside of the flange 16. As shown in FIG. 1, the holder 14b to which the rotor yoke 14d is attached on the outer peripheral face side is bolted to the outer peripheral portion of the rotational shaft 14a.

As shown in FIG. 1, the holder 14b is bolted to the rotational shaft 14a in a state in which the rotational shaft 14a is inserted into a center hole. The holder 14b is a steel member having a substantially cylindrical shape, has a structure that combines an inner cylinder and an outer cylinder, the bearing 18 is attached between the outer peripheral face of this inner cylinder and the inner peripheral face of the outer cylinder, and the rotor yoke 14d is attached to the outer peripheral face of the outer cylinder.

The cooling oil injection ports 14c are holes formed in the outer peripheral face of the rotor 14 so that cooling oil circulating inside and outside the first and second housings 11 and 15 will be scattered outward in the radial direction by centrifugal force generated by rotation of the rotor 14. As shown in FIG. 2, a plurality of the cooling oil injection ports 14c are provided at an equal angular spacing to both end portions in the axial direction on the outer peripheral face of the rotor 14. They are also disposed so that the coils 23 wound around the plurality of protrusions 20a of the stator core 20 via the insulator 21 will be exposed, on the inner peripheral face on the stator 10 side opposite the cooling oil injection ports 14c (see FIG. 4).

The rotor yoke 14d is a structure consisting of a plurality of laminated steel plates (magnetic steel plates), and as shown in FIG. 1, is bolted to the outer peripheral face side of the holder 14b, and has a plurality of inductors (not shown) provided at an equal angular spacing in the peripheral direction on the outer peripheral face side of a circular main body. The rotor yoke 14d is supported so as to be sandwiched by aluminum blades 14e provided on the engine side and the hydraulic pump side. Through-holes (the cooling oil injection ports 14c) that open outward in the radial direction are formed in the outer peripheral faces of the blades 14e. When the rotor 14 rotates, cooling oil is sprayed through these cooling oil injection ports 14c onto the coils 23 disposed on the outside in the radial direction. These blades 14e need not be provided if the rotor yoke 14d can be supported by recesses formed in the holder 14b, for example.

The second housing 15 is a cast iron member, is provided on the hydraulic pump side (the right side in FIG. 1) of the generator motor 1, and along with the first housing 11 forms a holding spacing for holding the flywheel 12, the coupling 13, the rotor 14, and the stator 10. The second housing 15 has an oil cooler 15d for cooling the cooling oil. The outlet to the oil cooler 15d is connected to a cooling oil pipe 15a for sending cooling oil up to the upper part inside the first and second housings 11 and 15. An electrical box 17 connected to the wiring of the coils 23 wound around the protrusions 20a of the stator core 20 via the insulator 21, etc., is attached to the shoulder of the second housing 15.

The cooling oil held in the sump V goes through a pipe (not shown), a filter (not shown), and a circulation pump and is supplied to the inlet to the oil cooler 15d provided at the lower part of the second housing 15. The cooling oil pipe 15a connected to the outlet, of the oil cooler 15d is connected to the upper connection portion of the second housing 15 as shown in FIG. 2 in order to supply cooling oil scooped up from the sump V to the upper part of the space formed inside the first and second housings 11 and 15.

As shown in FIG. 1, the flange 16 is a disk-shaped member disposed coaxially with the rotational shaft 14a, and in its interior is formed a cooling oil path 16a that guides the cooling oil sent through the cooling oil pipe 15a to the upper part of the second housing 15 to the desired portions. The flange 16 is fixed by a plurality of bolts to the hydraulic pump side of the second housing 15. The flange 16 has a substantially cylindrical bearing support 16e that protrudes in the axial direction from a substantially disk-shaped face. The bearing support 16e supports the bearing 18 on the substantially cylindrical outer peripheral face side.

The cooling oil path 16a supplies cooling oil that has flowed from the upper space inside the first and second housings 11 and 15, to the bearing 18, splines (joining portions), and so forth in contact with the members on the stationary side and the members on the rotating side. Consequently, a sufficient quantity of lubricating oil (cooling oil) is supplied at all times to the bearing 18, splines (joining portions), and so forth.

Here, the cooling oil sprayed outward in the radial direction from the cooling oil injection ports 14c as the rotor 14 rotates is sent from the sump V provided at the lower part of the space formed inside the first and second housings 11 and 15, to the upper part. The cooling oil is then sent from the upper part of the space in the first and second housings 11 and 15, along the cooling oil path 16a formed inside the flange 16, and to the outer peripheral portion of the rotational shaft 14a and the bearing 18. After this, the cooling oil moves outward in the radial direction of the rotor 14 under the centrifugal force produced by rotation of the rotor 14, and is supplied through the cooling oil injection ports 14c to the coils 23 on the side of the hydraulic pump disposed on the outside in the radial direction. The cooling oil sprayed outward in the radial direction of the rotor 14 moves downward through the first and second housings 11 and 15 and back to the sump V.

The cooling oil also goes through a through-hole on the inside of the rotational shaft 14a, and lubricates and cools the splines on the engine side. After this, the cooling oil moves outward in the radial direction under the centrifugal force produced during rotation of members on the rotating side, and is also used to cool the coils 23 provided on the engine side.

Insulator 21

The insulator 21 used in the generator motor 1 in this embodiment is injection molded from a PPS (polyphenylene sulfide) resin with excellent heat resistance and moldability. The insulator 21 is divided up into 12 parts in the peripheral direction, and into two parts above and below in the axial direction, with 12 each of first members 31 (see FIG. 5) and second members 32 (see FIG. 7) being put together. That is, the first and second members 31 and 32 each integrally constitute three main bodies 21b so as to cover three protrusions 20a at the same time.

The first and second members 31 and 32 are attached so as to sandwich the protrusions 20a of the stator core 20 from above and below. The coils 23 are wound around the outer peripheral part of the protrusions 20a covered by the first and second members 31 and 32. This allows the stator core 20 to be electrically insulated from the coils 23.

First Members 31

Figure 5:
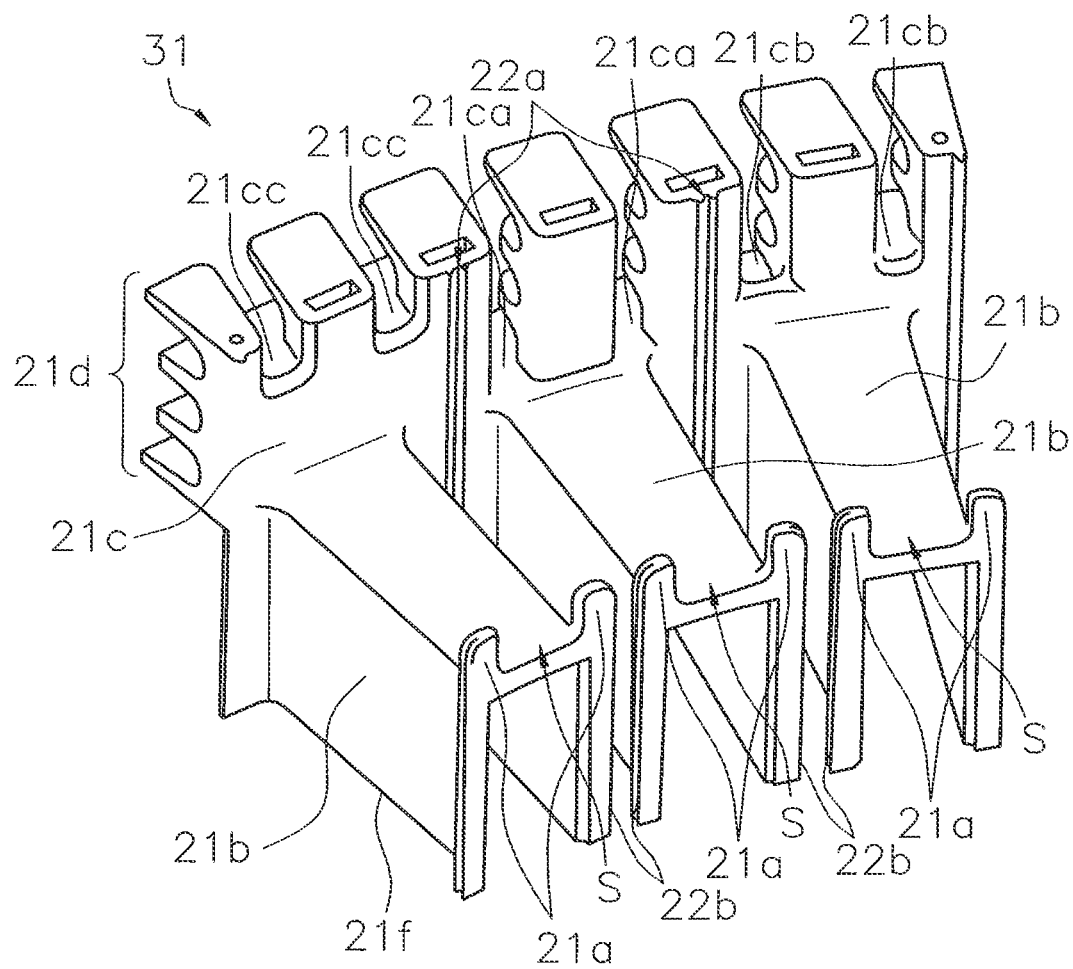
FIG. 5 is an oblique view of a first member of the insulator included in the stator in FIG. 3.
Figure 6:
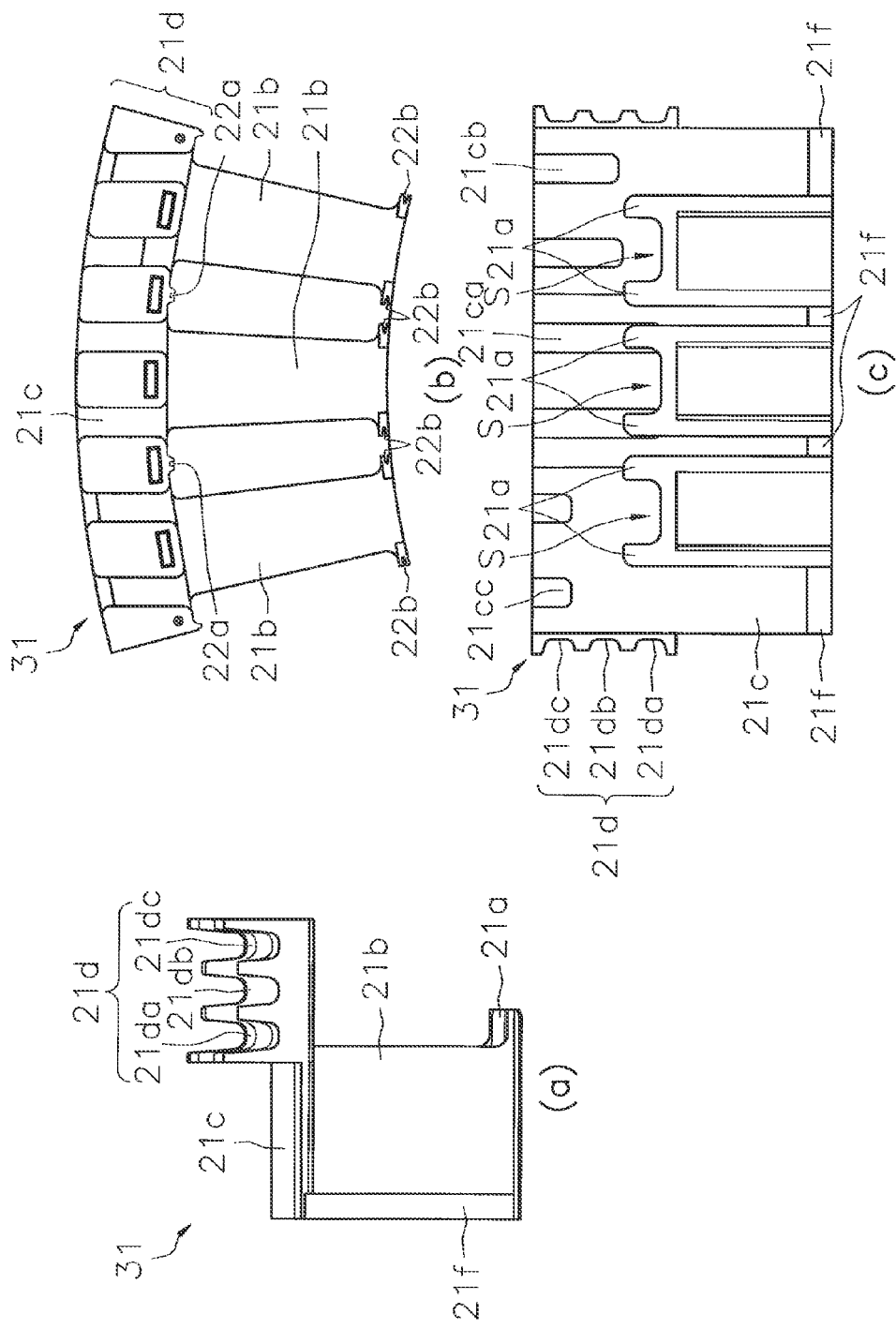
FIGS. 6a to 6c are, respectively, a side view, a plan view, and a front view of the configuration of the first member in FIG. 5.

The first members 31 are disposed on the hydraulic pump side of the insulator 21 when installed in the generator motor 1 in a state of being mounted to the stator core 20, and as shown in FIG. 5, have main bodies 21b, a support portion 21c, wiring guides 21d, stepped portions 21f, and grooves 22a and 22b.

Latching portions 21a are provided the furthest to the inside in the radial direction (inner peripheral side) of the circular insulator 21, and are formed so as to protrude up and down in the axial direction at the inner ends in the radial direction of the main bodies 21b around which the coils 23 are wound. As shown in FIG. 4, the latching portions 21a are formed up to positions slightly higher than the winding height of the coils 23, and latch the coils 23 wound around the main bodies 21b so they do not fall off. As shown in FIG. 5, the latching portions 21a are substantially U-shaped when seen from the inside in the radial direction. Consequently, the latching portions 21a form a slot that exposes the wound portion of the coils 23 toward the inside in the radial direction. The slots S are disposed in the direction in which the cooling oil is scattered, that is, opposite the plurality of cooling oil injection ports 14c formed in the outer peripheral faces of the circular blades 14e disposed so as to sandwich the holder 14b.

As shown in FIG. 5, the main bodies 21b are members with a substantially U-shaped cross section that cover the protrusions 20a of the stator core 20, and when the first and second members 31 and 32 are put together, an internal space is formed for holding the protrusions 20a. Three main bodies 21b are integrated by the support portion 21c, and each protrude inward in the radial direction.

The support portion 21c is a curved face that integrally supports three main bodies 21b and, as shown in FIG. 6b, is provided on the outside in the radial direction of the main bodies 21b. As shown in FIG. 5, the support portion 21c has first grooves 21ca, second grooves 21cb, and third grooves 21cc formed along the axial direction at the end on the opposite side from the side where the second member 32 is joined (the hydraulic pump side in the axial direction in FIG. 1).

As shown in FIG. 6c, the first, grooves 21ca are deeper in the axial direction than the second and third grooves 21cb and 21cc, and guide the wire pulled out from the coil 23 (such as an A-phase wire 23a) to a guide groove 21da of the wiring guide 21d.

As shown in FIG. 6c, the second grooves 21cb have a depth in the axial direction that is in between those of the first and third grooves 21ca and 21cc, and guide the wire pulled out from the coil 23 (such as a B-phase wire 23b) to a guide groove 21db of the wiring guide 21d.

As shown in FIG. 6c, the third grooves 21cc have a depth in the axial direction that is shallower than those of the first, and second grooves 21ca and 21cb, and guide the wire pulled out from the coil 23 (such as a C-phase wire 23c) to a guide groove 21dc of the wiring guide 21d.

The wiring guide 21d is formed along the peripheral direction in the face of the support portion 21c that is on the outside in the axial direction, and has the guide grooves 21da to 21dc that separately guide three phases of coil wire (the A-phase wire 23a, the B-phase wire 23b, and the C-phase wire 23c). As shown in FIG. 1, the wiring guide 21d is disposed in an orientation that protrudes to the hydraulic pump side in the axial direction (the right side in FIG. 1) in a state in which the insulator 21 has been attached to the generator motor 1. Consequently, the rotation of the flywheel 12 is unaffected by the protruding portion of the insulator 21.

As shown in FIGS. 6a and 6c, the guide grooves 21da to 21dc are disposed along the peripheral direction in the order of guide grooves 21da, 21db, and 21dc, from the main body 21b side toward the end in the axial direction.

Figure 9:
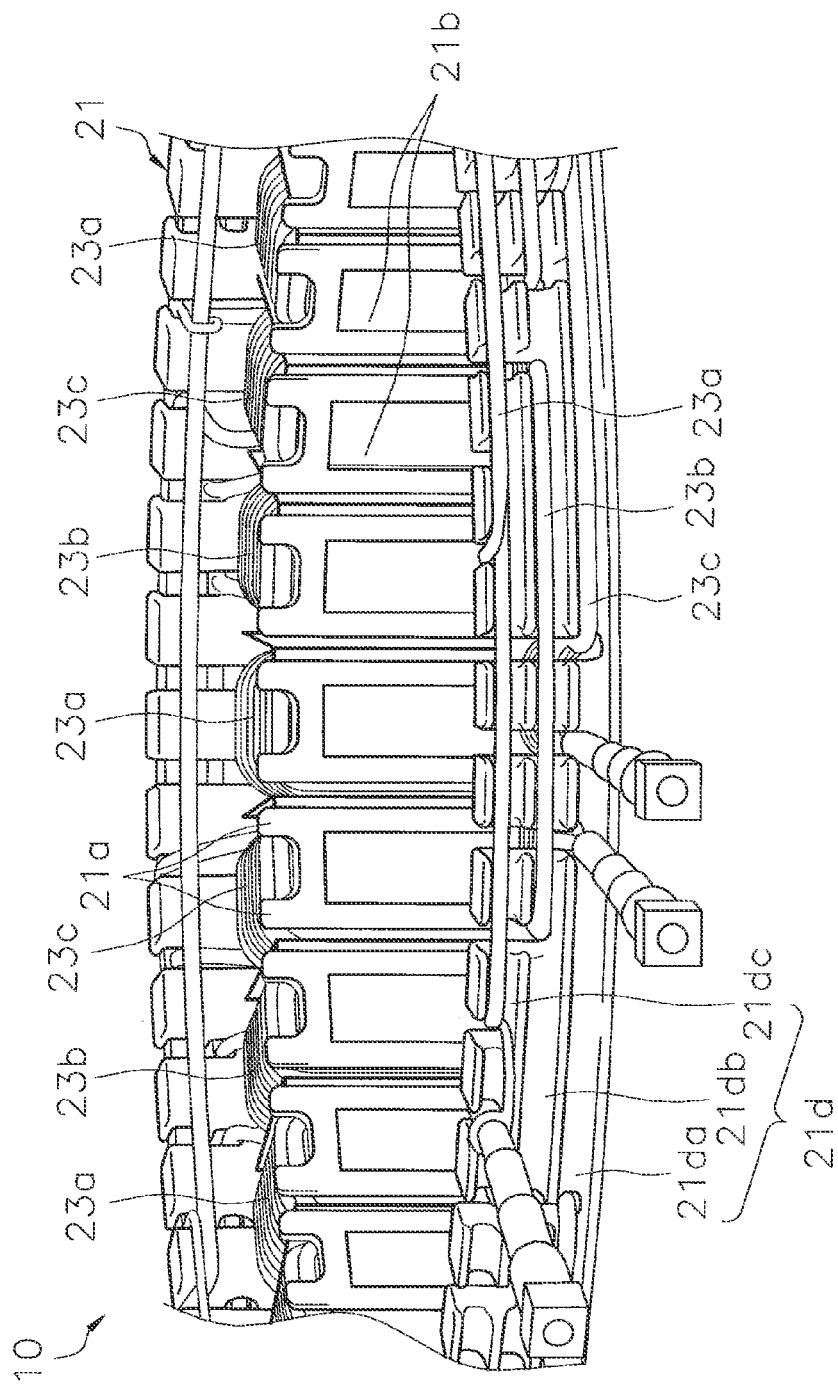
FIG. 9 is an oblique view of the routing of the coil wiring wound around the stator core via the insulators.

As shown in FIG. 9, when the coil 23 is wound around the main body 21b, the phase of coil wire that is first wound (such as the A-phase wire 23a) is guided by the guide groove 21da via the first grooves 21ca. The guide groove 21da then guides the A-phase wire 23a counter-clockwise in the peripheral direction to the three adjacent main bodies 21b. Consequently, the A-phase wire 23a is wound around every third main body 21b disposed along the peripheral direction.

As shown in FIG. 9, the guide groove 21db guides the wire of the phase (such as the B-phase wire 23b) wound around the main body 21b adjacent in the clockwise direction to the main body 21b around which the A-phase wire 23a was wound, via the second grooves 21cb. Consequently, the B-phase wire 23b is wound around every third main body 21b disposed along the peripheral direction.

As shown in FIG. 9, the guide groove 21dc guides the wire of the phase (such as the C-phase wire 23c) wound around the main body 21b adjacent in the clockwise direction to the main body 21b around which the B-phase wire 23b was wound, via the third grooves 21cc. Consequently, the C-phase wire 23c is wound around every third main body 21b disposed along the peripheral direction.

Here, the guide grooves 21da, 21db, and 21dc provided for routing the coil wires to the face on the outer peripheral side of the insulator 21 separate the three phases of coil wire and guide them in the peripheral direction. The guide grooves 21da, 21db, and 21dc are disposed in three steps in the axial direction. The first, second, and third grooves 21ca, 21cb, and 21cc are formed so that there are three different groove depths in the axial direction in order to guide the coil wires to these steps. Consequently, minimizing the depth of the first to third grooves 21ca to 21cc formed in the axial direction ensures good stiffness for the insulator 21 overall, and prevents the insulator 21 from being broken by the load exerted during the winding of the coils 23.

As shown in FIG. 6a, the stepped portions 21f are formed at the end on the side joined with the second member 32 in the axial direction, and when the first members 31 and the second members 32 are joined, the stepped portions 21f of the first and second members 31 and 32 fit together. Therefore, even when a high voltage is applied to the surface of the insulator 21, current can be prevented from flowing directly in the axial direction.

The grooves 22a are formed in the axial direction between the main bodies 21b on the face on the inner peripheral side of the support portion 21c.

The grooves 22b are formed opposite each other between mutually adjacent latching portions 21a, and are formed on the side face portions of the latching portions 21a in the peripheral direction.

Insulating paper (insulation material) 40 (see FIG. 3) that is T-shaped in top view is inserted in the axial direction into the grooves 22a and 22b. Consequently, adjacent coils 23 can be easily insulated, so that no electrical connection occurs between the coils 23 wound around mutually adjacent main bodies 21b.

Figure 10:
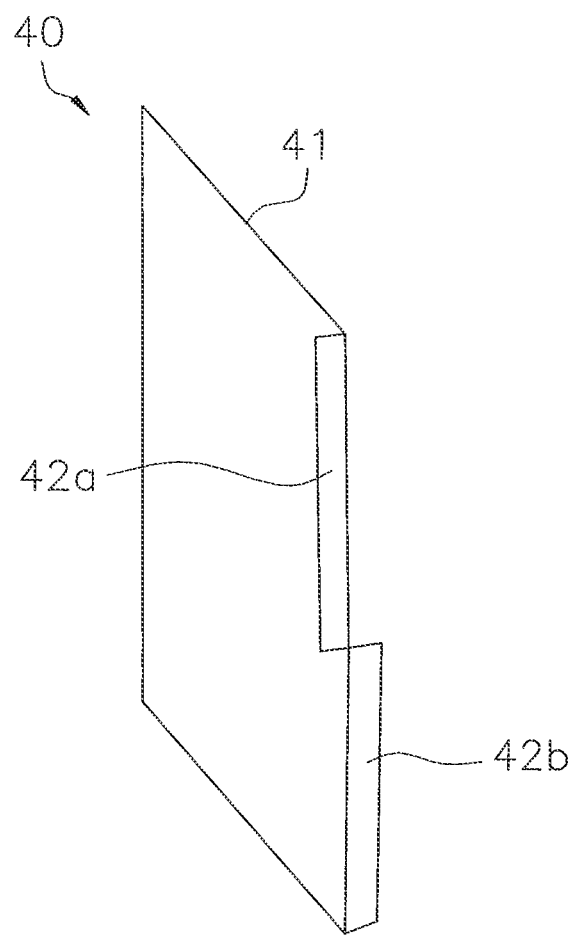
FIG. 10 is an oblique view of insulating paper that is attached to the insulators.

As shown in FIG. 10, the insulating paper 40 has a blocking portion 41 that blocks between the coils 23 wound around adjacent main bodies 21b, and bent parts 42a and 42b formed by bending the upper half of the end of the blocking portion 41 on the inside in the radial direction to the left, and bending the lower half to the right. Consequently, the insulating paper 40 is T-shaped when viewed in the axial direction. Thus, the insulating paper 40 can be held in the gap between the main bodies 21b of the insulator 21 by inserting the bent parts 42a and 42b into the groove 22b, and the end of the blocking portion 41 on the opposite side from the bent parts 42a and 42b into the groove 22a.

Second Members 32

Figure 7:
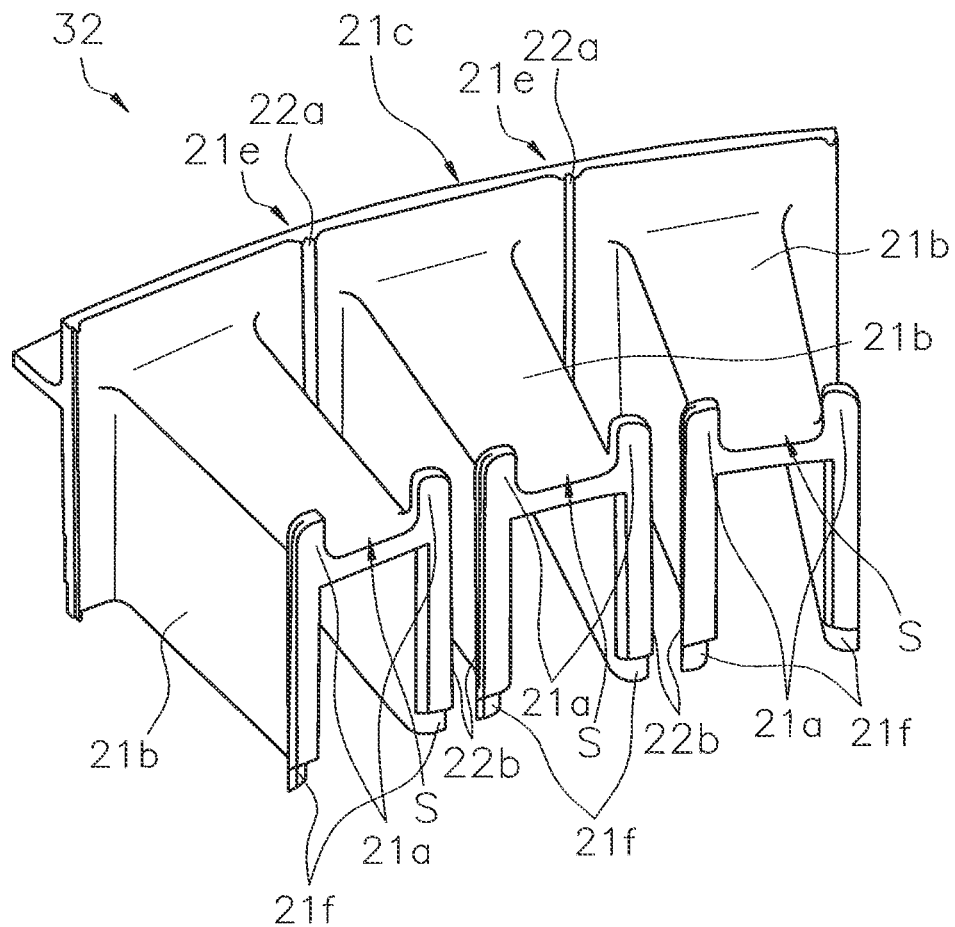
FIG. 7 is an oblique view of a second member of the insulator included in the stator in FIG. 3.
Figure 8:
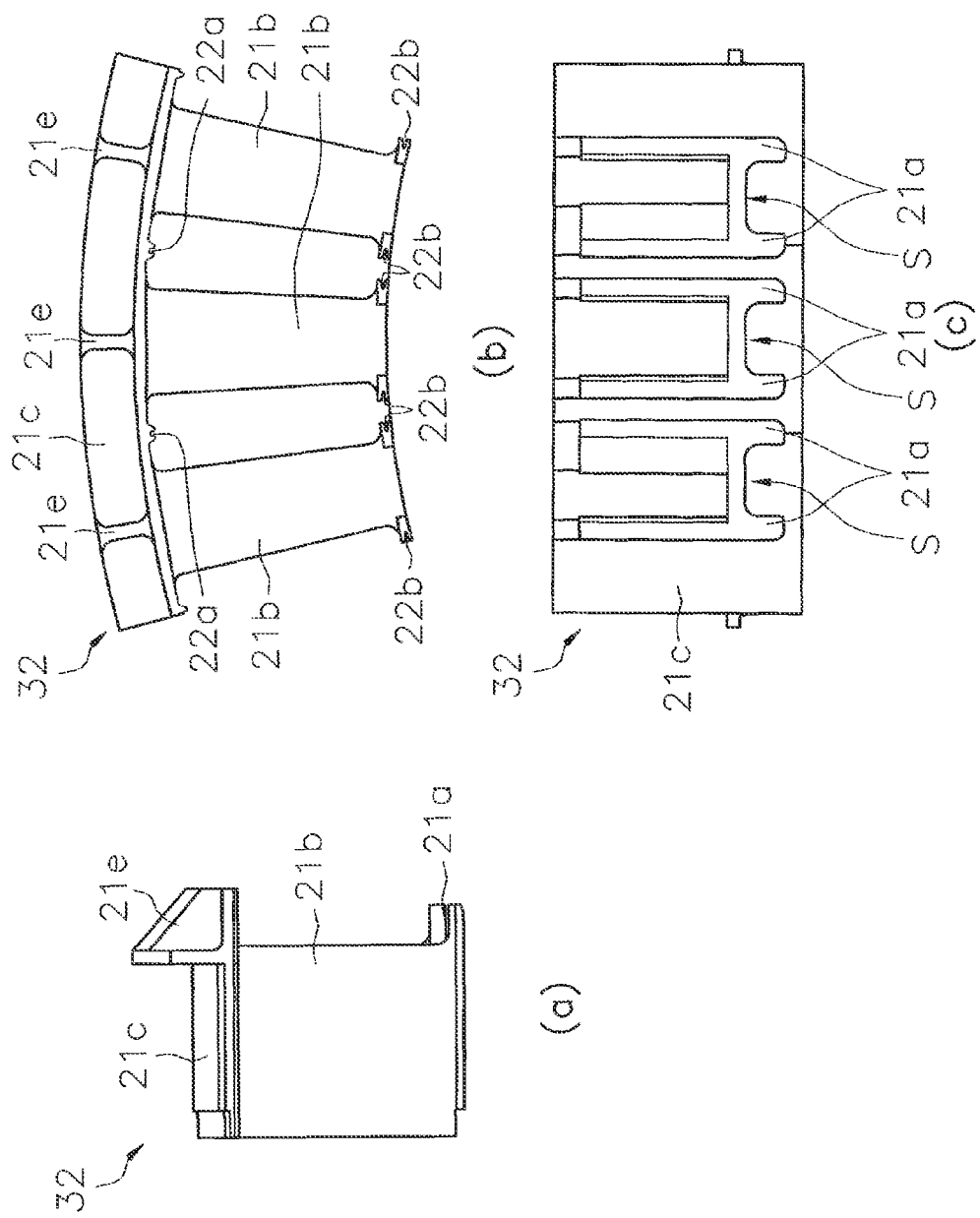
FIGS. 8a to 8c are, respectively, a side view, a plan view, and a front view of the configuration of the second member in FIG. 7.

The second members 32 are put together with the above-mentioned first members 31 to constitute the insulator 21, and as shown in FIG. 7, have latching portions 21a, main bodies 21b, a support portion 21c, ribs 21e, and stepped portions 21f. The second members 32 differ from the above-mentioned first members 31 in that they have the ribs 21e and do not have the wiring guide 21d. Thus, those members having the same function as the members included in the first members 31 (the latching portions 21a, the main bodies 21b, the support portion 21c, and the stepped portions 21f) will not be described again.

In a state in which the first and second members 31 and 32 have been joined, as shown in FIG. 8c, the latching portions 21a are disposed so as to protrude in the opposite direction from that of the latching portions 21a on the first member 31 side.

As shown in FIG. 8b, the ribs 21e join the face of the support portion 21c that runs in the axial direction and the face that runs in the peripheral direction (these faces are perpendicular to one another). Consequently, the ribs 21e reinforce the support portion 21c and increase the strength of the second members 32. The ribs 21e are preferably provided at positions on the rear side of the face of the support portion 21c where the main bodies 21b are formed, and not on the rear side of the face of the support portion 21c where the space in which the insulating paper 40 is inserted is formed.

Features

As shown in FIG. 4, with the insulator 21 of this embodiment, the slots S that expose the coils wound around the main bodies 21b are provided to the face of the latching portions 21a that are opposite the cooling oil injection ports 14c from which the cooling oil is injected as the rotor 14 rotates.

Consequently, even if a large amount of heat is generated by the generator motor 1, the cooling oil can be supplied directly to the coils 23, and as a result, the coils 23 wound around the main bodies 21b can be cooled more efficiently.

Other Embodiments

An embodiment of the present invention was described above, but the present invention is not limited to or by the above embodiment, and various modifications are possible without departing from the gist of the invention.

(A) In the above embodiment, an example was described in which the cooling oil was supplied from the cooling oil injection ports 14c of the rotor 14 disposed on the inner radial side of the stator core 20 (the insulator 21), through the slots S in the insulator 21 to the coils 23, but the present invention is not limited to this.

For example, if the configuration is such that the cooling oil is supplied from the outer radial side of the stator core, the slots for exposing the coils may be provided to the outer peripheral face of the insulator.

Here again, since the cooling oil can be supplied efficiently to the coils, the same effect as above, of being able to cool the coils more efficiently, can be obtained.

(B) In the above embodiment, an example was described in which substantially U-shaped members that had the slots S formed in their center portions were used as the latching portions 21a, but the present invention is not limited to this.

For example, an I-sbaped member may be used as a latching member. In this case, the openings for exposing the coils must be provided as much as possible to the face of the insulator on the side where the cooling oil is supplied. Therefore, if an I-shaped member is used as a latching member, it is preferable to provide an I-shaped member that is as narrow as possible to the end or the center portion of the insulator in the peripheral direction of the main body.

Also, the openings provided to the latching members for exposing the coils need not have a cut-out shape as discussed above, and may instead be holes.

(C) In the above embodiment, an example was described in which the insulator 21, composed of the first and second members 31 and 32 that were divided into upper and lower in the axial direction, was used and mounted so as to cover three of the protrusions 20a of the stator core 20 together from above and below, but the present invention is not limited to this. For example, one insulator may be mounted for each protrusion, or an insulator may be mounted so as to cover two protrusions or four or more protrusions.

Alternatively, if one insulator is mounted for each protrusion, a divided structure need not be used, and instead a one-piece insulator can be used which is mounted from the inside in the radial direction.

(D) In the above embodiment, an example was described in which the generator motor 1, etc., of the present invention was installed in a hybrid hydraulic excavator, but, the present invention is not limited to this.

For example, the present invention can also be applied to a generator motor that is installed in a hybrid wheel loader, bulldozer, dumper truck, or other such piece of construction machinery, or to a hybrid automobile or the like, as well as to the insulators included in these.

Furthermore, the present invention can be applied not only to the above-mentioned generator motor, but also PM (permanent magnet) motors and other such generator motors, and to motors used in electrical construction machinery that has no internal combustion engine and is driven by a capacitor, as well as to insulators used in these.

The insulator of the illustrated embodiments has the effect of increasing the cooling efficiency of cooling oil supplied to coils wound around a stator core, and therefore can be widely applied to insulators wound with coils cooled by cooling oil in the housings of generator motors and so forth.

The invention claimed is:
1. An insulator adapted to be disposed between a stator core and a coil installed in a generator motor to which is supplied cooling oil for cooling the coil to electrically insulate the coil from the stator core, the insulator comprising:
   a main body configured to cover a portion of the stator core around which the coil is wound to insulate the stator core from the coil;
   a latching portion disposed at an end of a portion of the main body around which the coil is wound on an inner peripheral side of the stator core to latch the coil onto the main body, the latching portion being substantially U-shaped;
   a slot formed to expose the coil at the substantially U-shaped portion of the latching portion on a side where the cooling oil for cooling the coil is supplied to the coil, and
   first and second members respectively disposed in an upper side and a lower side in an axial direction of the stator core having a substantially annular shape, the first and second members constituting the insulator, the first and second members each having a support portion supporting a plurality of the main bodies on an inner radial side along a peripheral direction.

2. The insulator according to claim 1, wherein the latching portion is formed at a position that is slightly higher than a winding height of the coil.

3. The insulator according to claim 1, wherein a stepped portion is provided at a junction where the first member and the second member are joined together.

4. The insulator according to claim 1, further comprising a wiring guide provided on an outer radial side of the main body to guide wiring of the coil in a prescribed direction.

5. The insulator according to claim 1, further comprising:
   a support portion supporting a plurality of the main bodies on an inner radial side along a peripheral direction; and
   ribs formed on a face of the support portion on an outer radial side and extending along a radial direction.

6. A stator of a motor comprising:
   the insulator according to claim 1;
   the stator core to which the insulator is mounted; and
   the coil wound around the stator core via the insulator.

7. A motor comprising:
   the stator according to claim 6;
   a rotor configured to rotate with respect to the stator; and
   a rotational shaft serving as a rotational center of the rotor.

8. The insulator according to claim 1, further comprising an amount of the plurality of main bodies corresponds to a number of phases of the generator motor.

9. The insulator according to claim 8, further comprising a plurality of guide grooves disposed along the peripheral direction outside the support portion, an amount of the plurality of guide grooves corresponding to the number of phases of the generator motor.

10. The insulator according to claim 9, further comprising a plurality of grooves disposed in the support portion, each of the plurality of grooves having a different axial depth, an amount of the plurality of grooves corresponding to the number of phases of the generator motor.

11. An insulator adapted to be disposed between a stator core and a coil installed in a generator motor to which is supplied cooling oil for cooling the coil to electrically insulate the coil from the stator core, the insulator comprising:
   a main body configured to cover a portion of the stator core around which the coil is wound to insulate the stator core from the coil;
   a latching portion disposed at an end of a portion of the main body around which the coil is wound to latch the coil onto the main body;

a slot formed to expose the coil at a portion of the latching portion on a side where the cooling oil for cooling the coil is supplied to the coil;

a support portion supporting a plurality of the main bodies on an inner radial side along a peripheral direction; and grooves formed in an inner radial side face of the support portion and a side face of the latching portion, and into which are inserted insulation material for insulating adjacent coils.

* * * * *